(No Model.)
J. M. WILLIAMS, Jr.
STOVE PIPE DAMPER.
No. 382,126. Patented May 1, 1888.
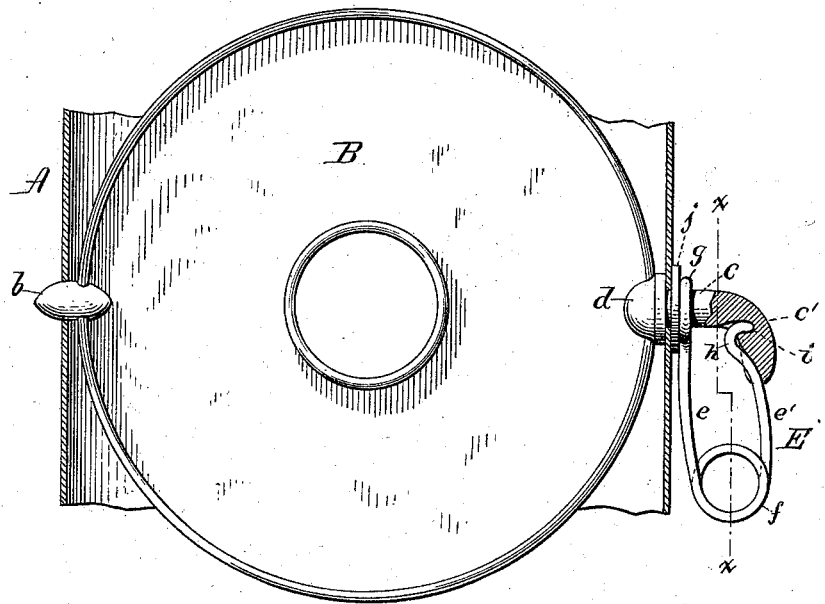
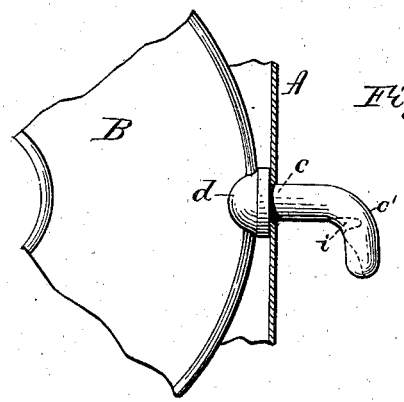
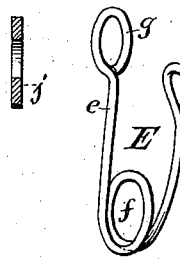
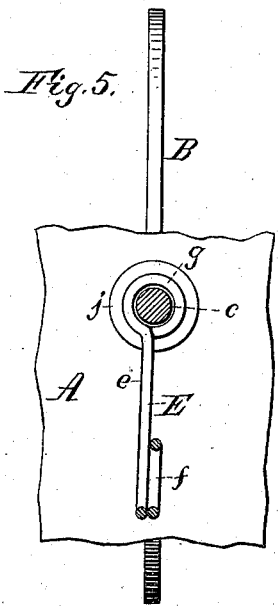
Witnesses:
Theo. L. Popp,
Geo. J. Buchheit Jr.
James M. Williams Jr. Inventor,
By Wilhelm & Bonner
Attorneys.

UNITED STATES PATENT OFFICE.

JAMES M. WILLIAMS, JR., OF HAMILTON, ONTARIO, CANADA.

STOVE-PIPE DAMPER.

SPECIFICATION forming part of Letters Patent No. 382,126, dated May 1, 1888.

Application filed July 5, 1887. Serial No. 243,350. (No model.)

*To all whom it may concern:*

Be it known that I, JAMES M. WILLIAMS, Jr., of Hamilton, in the county of Wentworth and Province of Ontario, Canada, have invented a new and useful Improvement in Stove-Pipe Dampers, of which the following is a specification.

This invention relates to an improvement in that class of stove-pipe dampers which are provided with springs, whereby the damper is held by friction in any desired position, and has for its object to provide a damper of simple construction which can be readily applied to the stove-pipe, and which can be manufactured at comparatively small cost.

The invention consists of the improvement which will be hereinafter fully described, and pointed out in the claims.

In the accompanying drawings, Figure 1 is a sectional elevation of my improved damper applied to a stove-pipe. Fig. 2 is a fragmentary elevation of the damper with the spring-handle and washer removed. Fig. 3 is a vertical section of the washer. Fig. 4 is a perspective view of the spring-handle. Fig. 5 is a vertical section in line $x\,x$, Fig. 1.

Like letters of reference refer to like parts in the several figures.

A represents the stove-pipe, and B the circular damper arranged within the same, and provided at diametrically-opposite sides with horizontal journals $b\,c$, which are arranged in suitable openings formed in the pipe A. The journal $c$ is provided at its junction with the damper with a shoulder or enlargement, $d$, which bears against the inner side of the stove-pipe. The outer portion of the journal extends outwardly beyond the stove-pipe, and is bent or curved, as shown at $c'$, so that this part of the journal can be readily passed through the opening in the stove-pipe by turning or swinging the damper in the plane of the bent portion.

E represents the handle whereby the damper is turned, and which is attached to the journal $c$. The handle E consists of a wire spring having two upright arms, $e\,e'$, which are connected at their lower ends by a coil, $f$, which increases the elasticity of the arms. The inner arm, $e$, of the handle is provided at its upper end with a ring or eye, $g$, which encircles the horizontal portion of the journal $c$, and the outer arm, $e'$, is provided at its upper end with a hook, $h$, which engages in a recess, $i$, formed in the inner side of the bent portion of said journal.

$j$ represents a washer surrounding the journal $c$, and interposed between the eye $g$ and the outer surface of the stove-pipe, and which forms a bearing for said eye. The outer arm, $e'$, of the spring-handle E presses the journal $c$ outwardly, whereby the shoulder $d$ is caused to bear against the inner surface of the stove-pipe with sufficient force to hold the damper in any position in which it may be placed.

In attaching the spring-handle to the damper the washer $j$ is first applied to the journal $c$, the eye $g$ of the handle is next placed upon the journal against the outer side of the washer, and the hook $h$ is then sprung into the recess $i$ of the journal.

My improved damper is very simple in construction, and consists of but few parts, the spring-handle E, with its eye $g$, hook $h$, and coil $f$, being formed of a single length of wire, and the damper, with its journals $b\,c$ and enlargement $d$, being cast complete in one piece. The spring-handle always remains cool, so that it can be conveniently manipulated.

I claim as my invention—

1. The combination, with the damper provided with an enlargement or shoulder, $d$, and a journal, $c$, formed in one piece with the damper, of a spring-handle, E, provided with two arms, one of said arms being attached to the journal $c$, and the other arm bearing against the stove-pipe, whereby the shoulder $d$ is caused to bear against the inner surface of the pipe and hold the damper from turning, substantially as set forth.

2. The combination, with the damper provided with a journal, $c$, having a recess, $i$, of a spring-handle, E, provided with a ring or eye, $g$, encircling said journal, and a hook, $h$, engaging in the recess of the journal, substantially as set forth.

3. The combination, with the damper provided with an enlargement, $d$, and a journal, $c$, having a recess, $i$, of a handle, E, composed of spring-arms $e\,e'$, connected by a coil, $f$, one of said arms being provided with an eye, $g$, which surrounds the journal $c$, and the other arm with a hook, $h$, which engages in the recess of the journal, substantially as set forth.

Witness my hand this 29th day of June, 1887.

J. M. WILLIAMS, JR.

Witnesses:
JNO. J. BONNER,
FRED. C. GEYER.